United States Patent [19]
Wu

[11] Patent Number: 5,193,932
[45] Date of Patent: Mar. 16, 1993

[54] COUPLER FOR REINFORCING BARS

[76] Inventor: Tsung-Hwei Wu, 1st Fl., No. 3, Lane 464, Sec. 6, Yenping N. Rd., Taipei, Taiwan

[21] Appl. No.: 886,412

[22] Filed: May 20, 1992

[51] Int. Cl.$^5$ ............................................. B25G 3/00
[52] U.S. Cl. ................................. 403/307; 403/309; 403/314
[58] Field of Search ............... 403/309, 310, 313, 290, 403/314, 305, 307

[56] References Cited

U.S. PATENT DOCUMENTS

| | | | |
|---|---|---|---|
| 368,764 | 8/1887 | Hammer | 403/314 |
| 1,000,149 | 8/1911 | Bristol | 403/307 X |
| 3,415,552 | 12/1968 | Howlett | 403/305 |
| 3,850,535 | 11/1974 | Howlett et al. | 403/305 |
| 4,146,951 | 4/1979 | Howlett | 403/314 X |
| 5,067,844 | 11/1991 | Bowmer et al. | 403/314 X |

FOREIGN PATENT DOCUMENTS 86778 10/1920 Switzerland ............. 403/314

Primary Examiner—Andrew V. Kundrat
Attorney, Agent, or Firm—Scully, Scott, Murphy & Presser

[57] ABSTRACT

A coupler for reinforcing bars includes an internally threaded sleeve with first and second internally threaded coupling portions respectively extending and tapering outward from two ends thereof. Each first and second coupling portion has a number of slits extending along a longitudinal direction thereof. The coupler further has first and second clamping collars each having a conical hole which tapers outward with an inner diameter of an inner opening thereof greater than that of an outer opening thereof and with a slope slightly greater than that of associated conical first and second coupling portions. An outer diameter of a distal end of each first and second coupling portion is slightly less than the inner diameter of the inner opening of associated first and second clamping collars. When the coupler is used to couple two reinforcing bars, a threaded coupling end of each reinforcing bar is screwed into the sleeve means via associated first and second coupling portions. Thereafter, the first and second clamping collars are pushed inward along an outer periphery of associated first and second coupling portions to tightly clamp the reinforcing bars in the coupler.

3 Claims, 3 Drawing Sheets

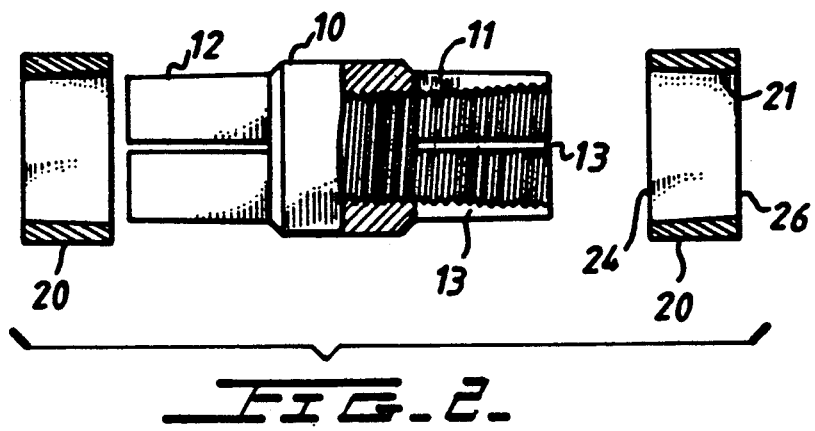
FIG_2
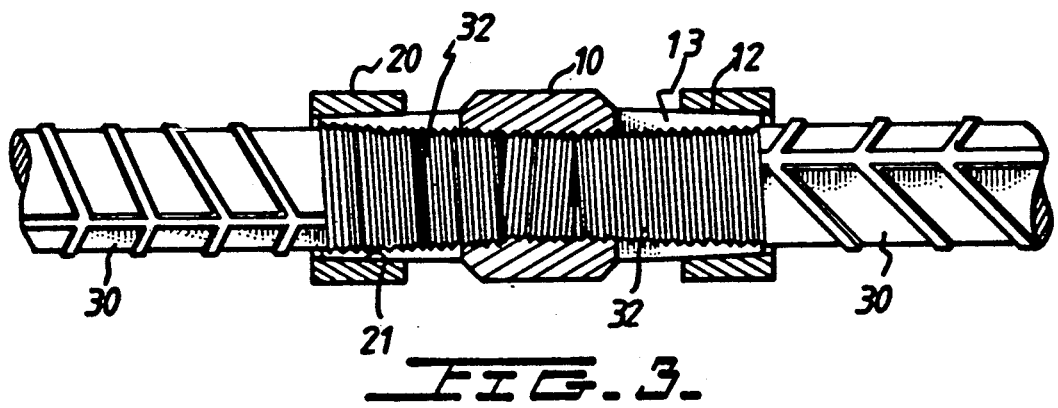
FIG_3

COUPLER FOR REINFORCING BARS

BACKGROUND OF THE INVENTION

The present invention relates to a coupler for reinforcing bars and to an improved coupling connection for reinforcing bars.

Inconvenience and time consumption are common problems encountered during the coupling of reinforcing bars. Therefore, there has been a long and unfulfilled need for an improved coupler and reinforcing bars to mitigate and/or obviate aforementioned problems while meeting strength requirements.

SUMMARY OF THE INVENTION

The present invention provides a coupler for reinforcing bars which generally includes an internally threaded sleeve means with first and second internally threaded coupling portions respectively extending and tapering outward from two ends thereof. Each first and second coupling portions has a plurality of slits extending along a longitudinal direction thereof.

The coupler further has first and second clamping collars each having a conical hole which tapers outward with an inner diameter of an inner opening thereof greater than that of an outer opening thereof and with a slope slightly greater than that of associated conical first and second coupling portions. An outer diameter of a distal end of each first and second coupling portion is slightly smaller than the inner diameter of the inner opening of associated first and second clamping collars.

When the coupler is used to couple two reinforcing bars, a threaded coupling end of each reinforcing bar is screwed into the sleeve means via associated first and second coupling portions. Thereafter, the first and second clamping collars are pushed inward along an outer periphery of associated first and second coupling portions to tightly clamp the reinforcing bars in the coupler.

Other objects, advantages, and novel features of the invention will become more apparent from the following detailed description when taken in conjunction with the accompanying drawings.

BRIEF DESCRIPTION OF THE DRAWINGS

FIG. 2 is a front elevational view, partly in section, of the coupler;

FIG. 3 is a front elevational view, partly in section, showing the coupler applied to couple two reinforcing bars;

DETAILED DESCRIPTION OF THE PREFERRED EMBODIMENTS

Figure 1:
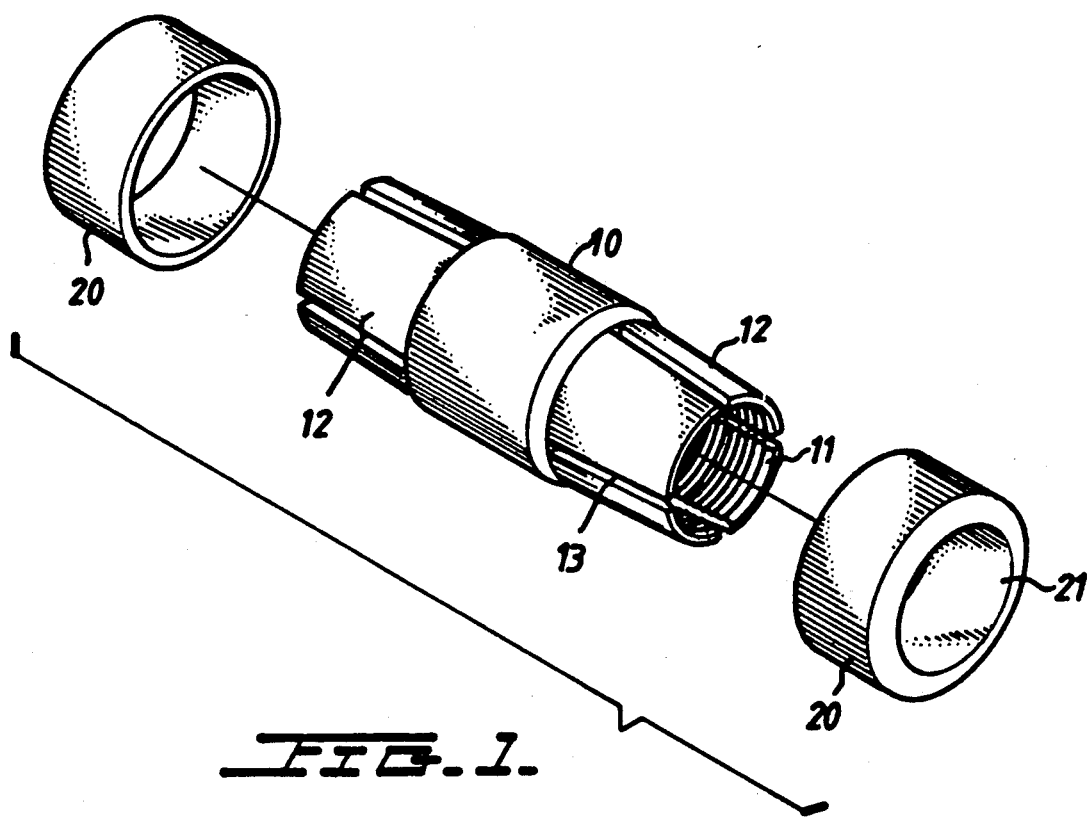
FIG. 1 is a perspective view of a coupler for reinforcing bars in accordance with the present invention.

Referring to FIGS. 1 and 2, a coupler for reinforcing bars in accordance with the present invention generally includes an internally threaded sleeve means 10 with first and second internally threaded coupling portions 12 respectively extending and tapering outward from two ends thereof. Each first and second coupling portions has a plurality of slits 13 extending along a longitudinal direction thereof.

The coupler further has first and second clamping collars 20 each having a conical hole 21 which tapers outward with an inner diameter of an inner opening 24 thereof greater than that of an outer opening 26 thereof and with a slope slightly greater than that of associated conical first and second coupling portions 12. An outer diameter of a distal end of each first and second coupling portion is slightly less than the inner diameter of the inner opening 24 of associated first and second clamping collars 20.

Referring to FIG. 3, when the coupler is used to couple two reinforcing bars 30, a threaded coupling end 32 of each reinforcing bar 30 is screwed into the inner threaded wall of sleeve means 10 via associated first and second coupling portions 12. Thereafter, the first and second clamping collars 20 are pushed inward by suitable conventional means (not shown) to move along an outer periphery of associated first and second coupling portions 12 to tightly clamp the reinforcing bars in the coupler, providing a secure coupling. Preferably, the inner diameter of the threaded inner wall 11 of the first and second coupling portions 12 tapers gradually and decreases from an outer end thereof to an inner end thereof, the taper cooperating with the tapered coupling end 32 of the reinforcing bars 30 to provide a more secure coupling.

Figure 4:
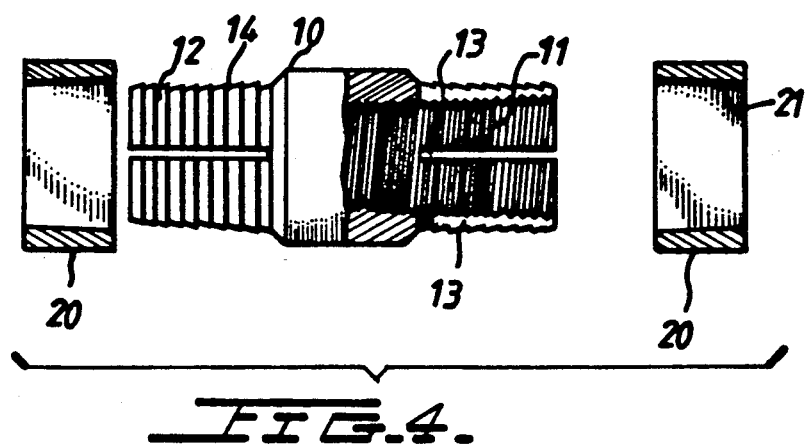
FIG. 4 is a front elevational view, partly in section, showing another embodiment of the coupler in accordance with the present invention.
Figure 5:
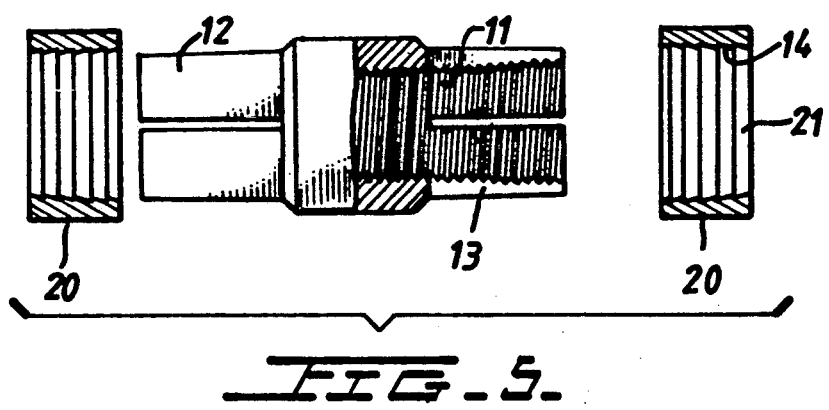
FIG. 5 is a front elevational view, partly in section, showing a further embodiment of the coupler in accordance with the present invention.

Referring to FIG. 4, for further securing, a plurality of annular teeth 14 are formed on an outer periphery of the first and second coupling portions 12 to form a unidirectional movement structure to prevent the clamping collars 20 from loosening from the coupling portions 12. FIG. 5 shows that the annular teeth 14 are provided on the inner wall of the clamping collars 20.

Although the invention has been explained in relation to its preferred embodiment, it is to be understood that many other possible modifications and variations can be made without departing from the spirit and scope of the invention as hereinafter claimed.

I claim:

1. A coupler for reinforcing bars comprising:
   an internally threaded sleeve means with a first and second internally threaded coupling portion respectively extending and tapering outward from two ends thereof, each said first and second coupling portion having a plurality of longitudinally formed slits; and
   first and second clamping collars each having a conical hole which tapers outward with an inner diameter of an inner opening thereof greater than that of an outer opening thereof and with a slope slightly greater than that of associated first and second coupling portions, an outer diameter of each said first and second coupling portion being slightly less than said inner diameter of said inner opening of associated said first and second clamping collars;
   whereby a threaded coupling end of said reinforcing bars is screwed into said coupler via said first and second coupling portions, and said first and second clamping collars are pushed inward along said outer periphery of associated said first and second coupling portions to securely clamp said reinforcing bars in said coupler.

2. The coupler for reinforcing bars as claimed in claim 1, wherein said outer periphery of said first and second coupling portions are provided with a plurality of annular teeth to form a unidirectional movement structure.

3. The coupler for reinforcing bars as claimed in claim 1, wherein said inner periphery of said first and second clamping collars are provided with a plurality of annular teeth to form a unidirectional movement structure.

* * * * *